United States Patent Office 2,823,904
Patented Feb. 18, 1958

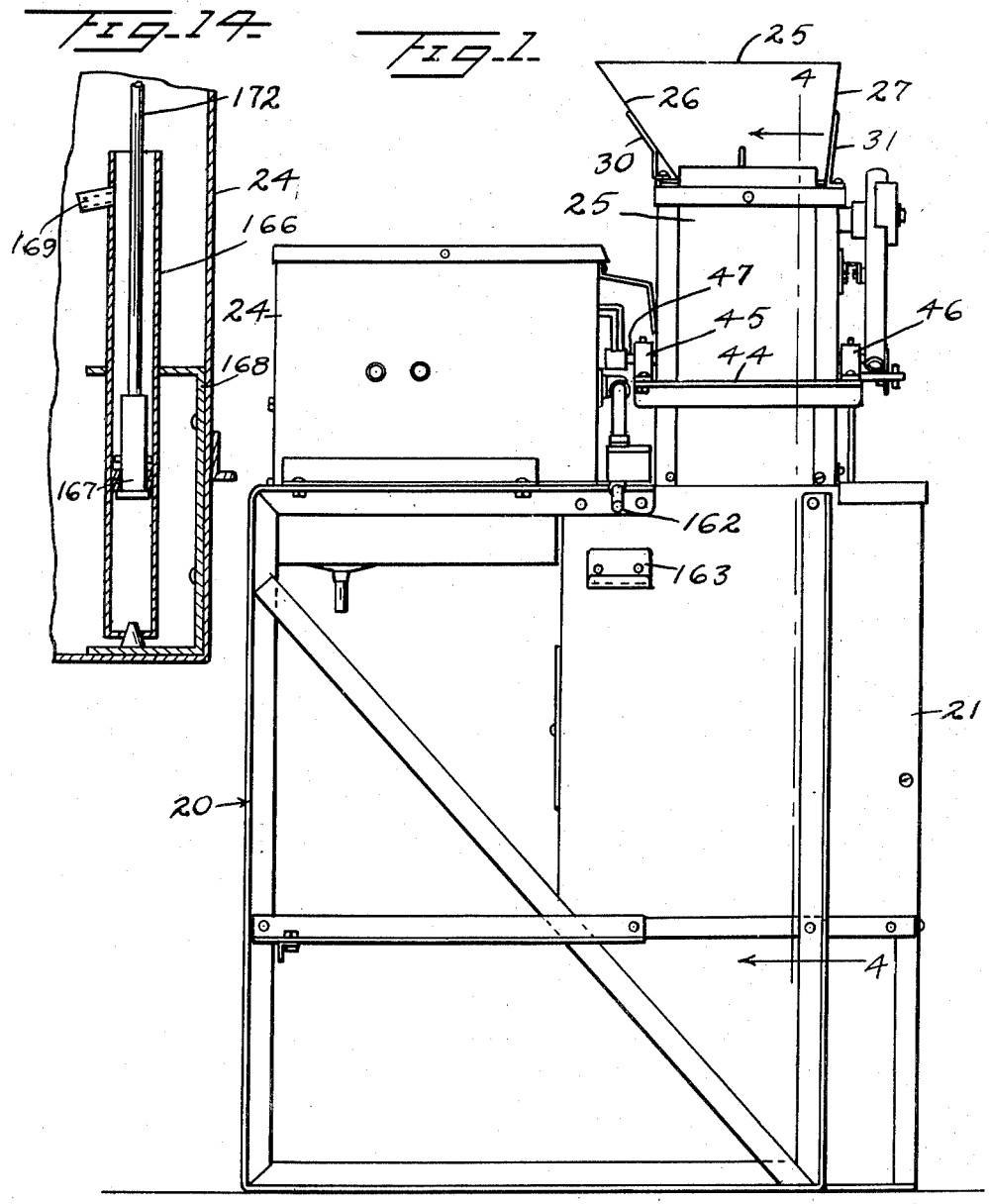

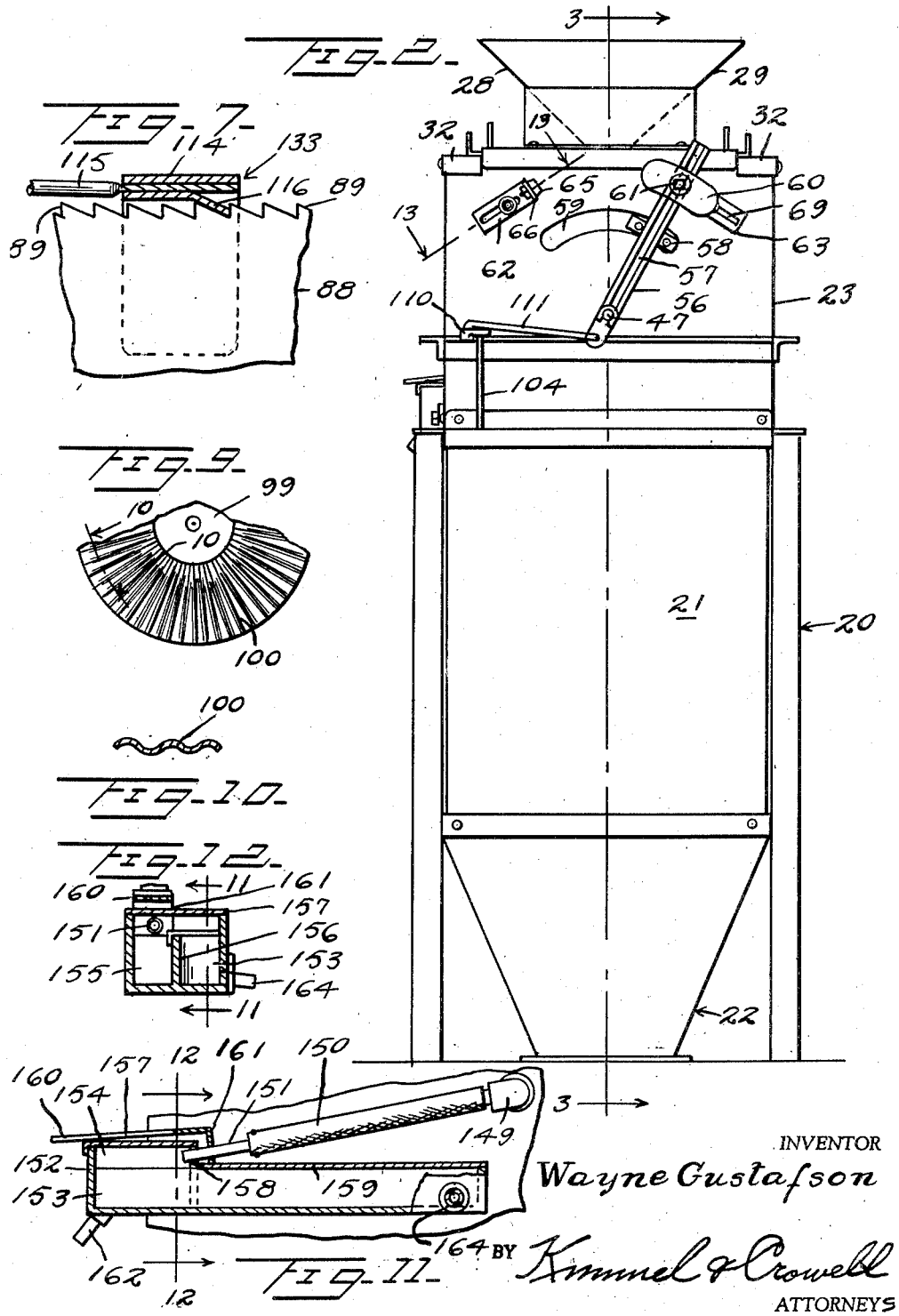

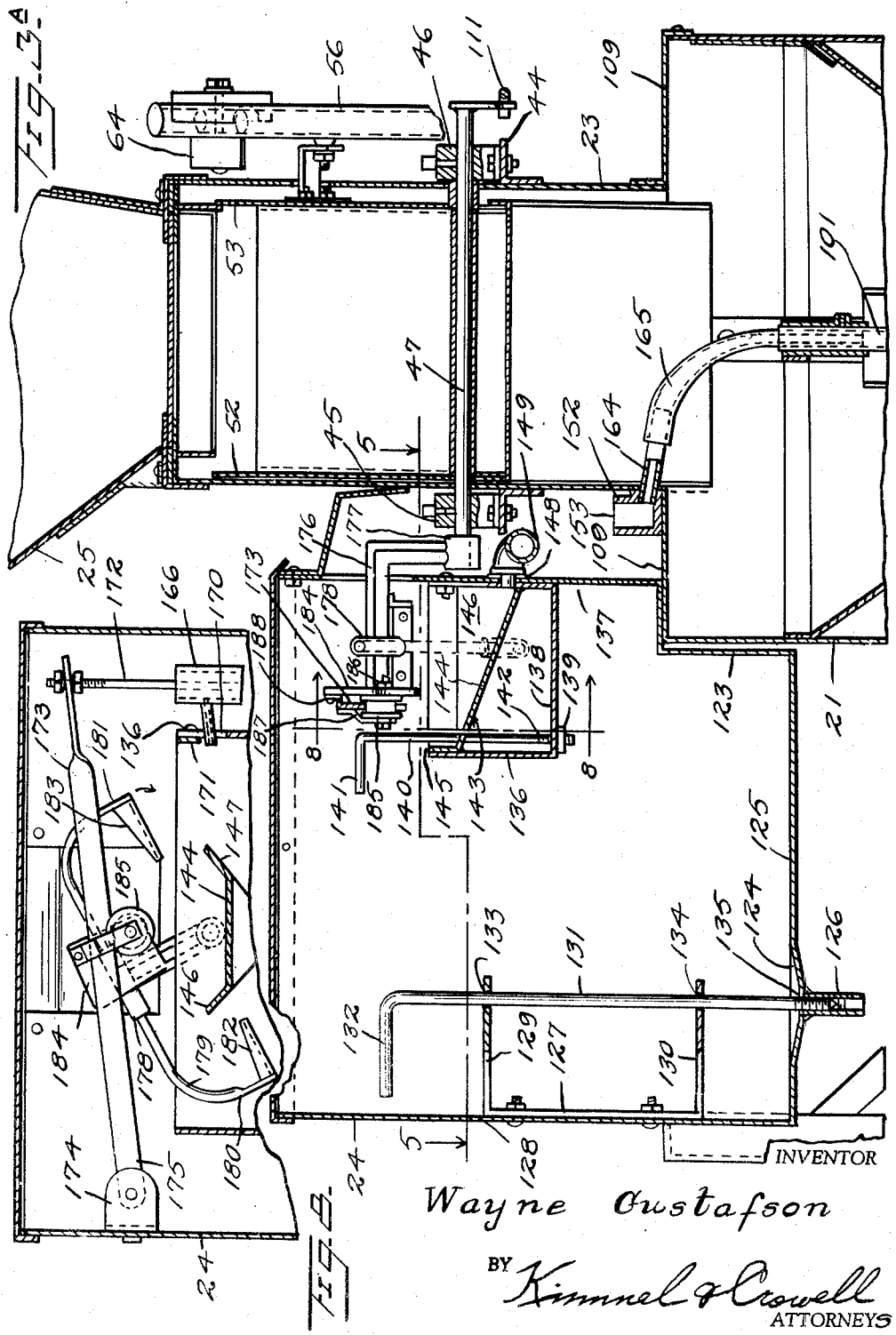

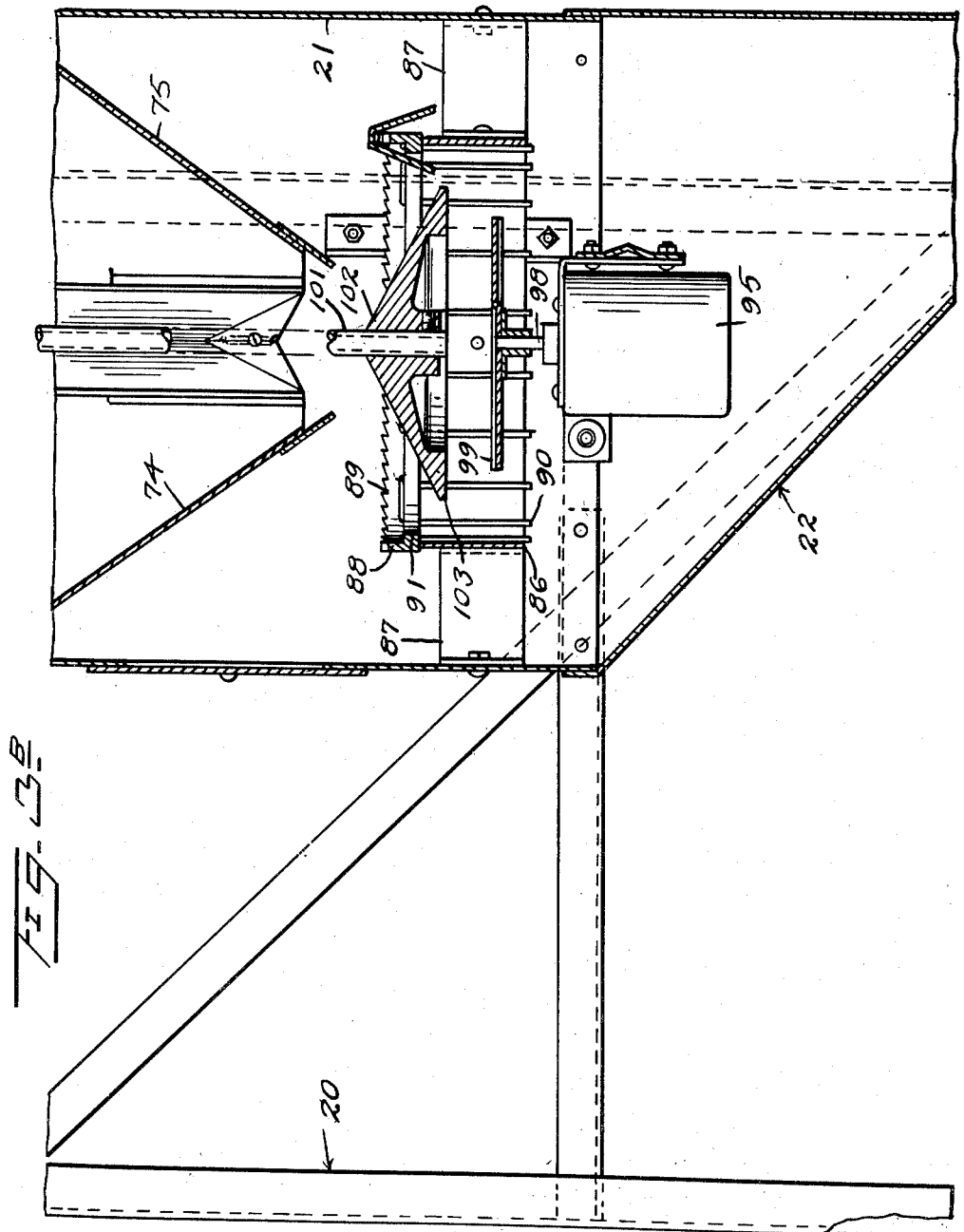

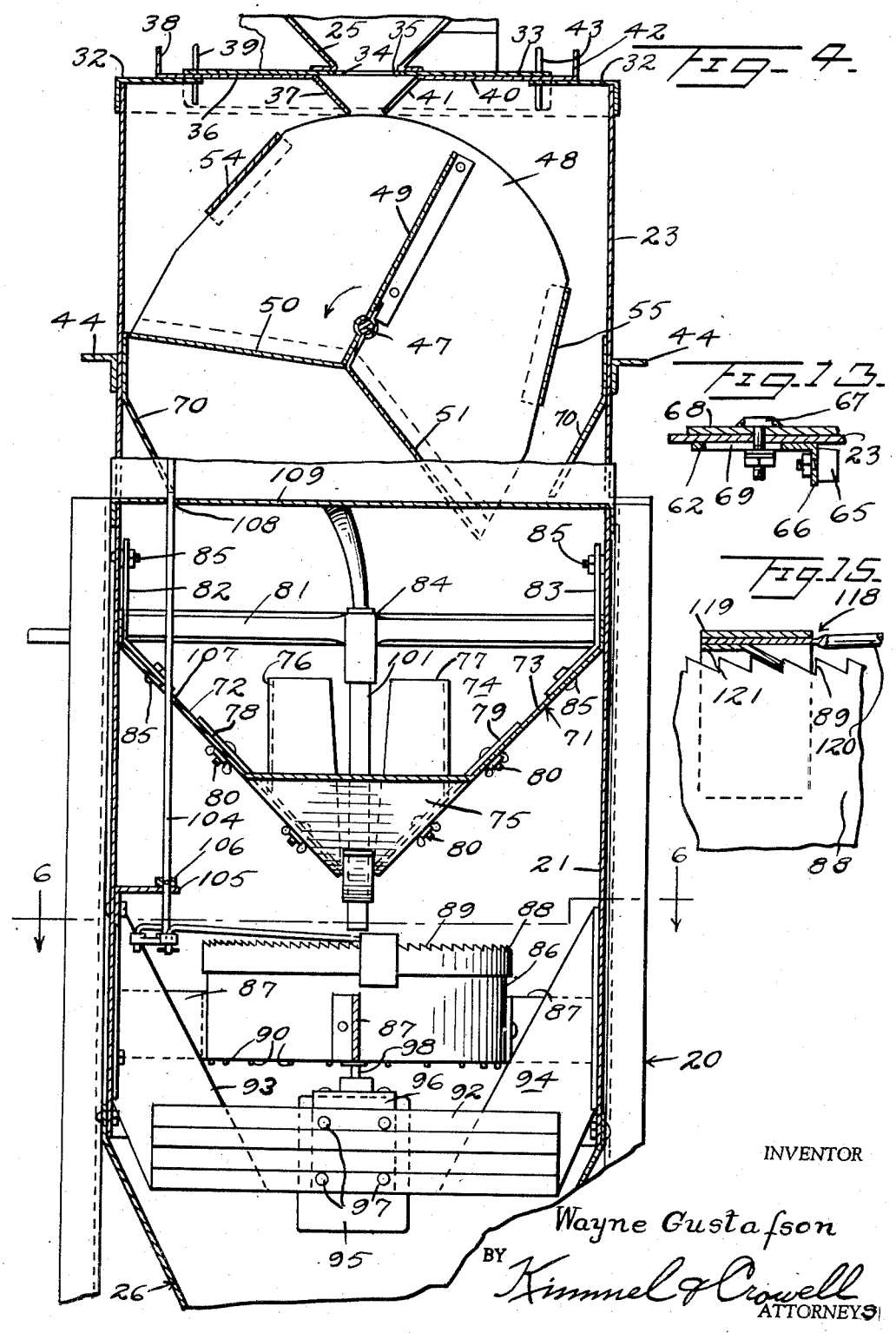

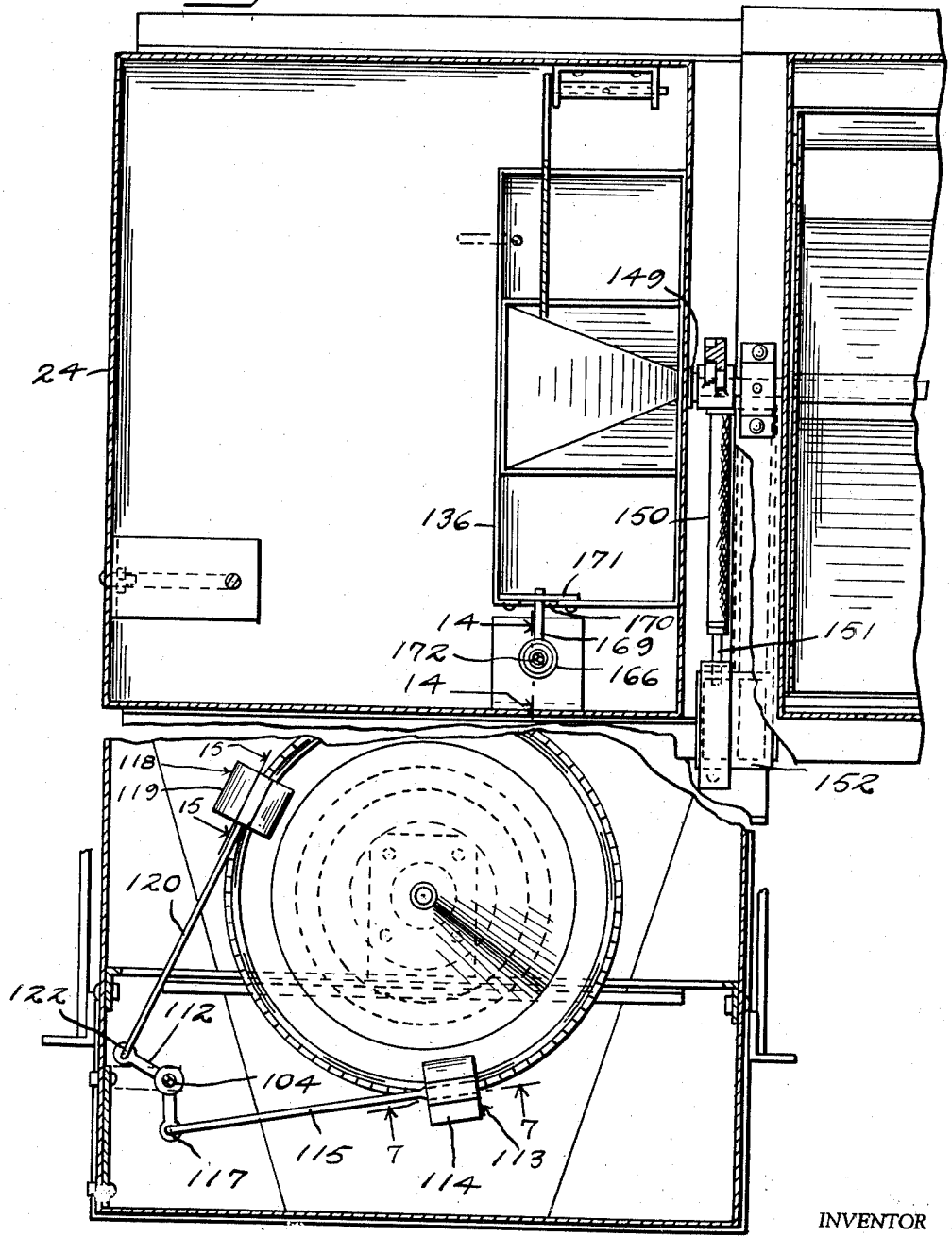

2,823,904

MATERIAL TREATING MACHINE

Wayne Gustafson, Moorhead, Minn.

Application October 14, 1955, Serial No. 540,483

6 Claims. (Cl. 259—24)

The present invention relates to a material treating machine, and more particularly to a machine for coating seeds with a chemical in fluid form.

The primary object of the invention is to provide a material treating machine of the class described, which may be utilized for treating or coating seed with chemical insecticides or fungicides to assist the seed in germination by protecting it from its natural enemies.

Another object of the invention is to provide a material treating machine of the class described wherein the seed coating fluid is reduced to an extremely fine mist and brought into contact with the seed so that the seed will be evenly coated thereby.

A further object of the invention is to provide a material treating machine having interrelated seed feeding and liquid feeding mechanisms whereby the quantities and percentages of seed and liquid are controlled.

A still further object of the invention is to provide a material treating machine of the class described wherein the operation of the seed feeding mechanism causes the operation of the fluid feeding mechanism so that a supply of fluid is assured for all of the seed fed through the machine.

Other objects and advantages will become apparent in the following specification when considered in the light of the attached drawings, in which:

Figure 1 is a side elevation of the invention;

Figure 2 is a front elevation of the invention;

Figure 3A is an enlarged fragmentary vertical cross-section of the upper portion of the machine taken along the line 3—3 of Figure 2, looking in the direction of the arrows;

Figure 3B is an enlarged fragmentary vertical cross-section of the lower portion of the machine, taken along the line 3—3 of Figure 2, looking in the direction of the arrows, and is a lower continuation of Figure 3A;

Figure 4 is an enlarged fragmentary vertical cross-section taken along the line 4—4 of Figure 1, looking in the direction of the arrows;

Figure 5 is an enlarged fragmentary horizontal cross-section, taken along the line 5—5 of Figure 3A, looking in the direction of the arrows;

Figure 6 is an enlarged fragmentary horizontal section taken along the line 6—6 of Figure 4, looking in the direction of the arrows;

Figure 7 is an enlarged fragmentary detail vertical section taken along the line 7—7 of Figure 6, looking in the direction of the arrows;

Figure 8 is an enlarged fragmentary transverse vertical section taken along the line 8—8 of Figure 3A, looking in the direction of the arrows;

Figure 9 is an enlarged fragmentary plan view of the liquid distributing disc;

Figure 10 is an enlarged fragmentary vertical cross-section taken along the line 10—10 of Figure 9, looking in the direction of the arrows;

Figure 11 is an enlarged fragmentary detail vertical cross-section taken along the line 11—11 of Figure 12, looking in the direction of the arrows;

Figure 12 is an enlarged fragmentary detail vertical cross-section taken along the line 12—12 of Figure 11, looking in the direction of the arrows;

Figure 13 is an enlarged fragmentary horizontal cross-section taken along the line 13—13 of Figure 2, looking in the direction of the arrows;

Figure 14 is an enlarged fragmentary vertical cross-section taken along the line 14—14 of Figure 5, looking in the direction of the arrows, and Figure 15 is an enlarged fragmentary detail vertical cross-section taken along the line 15—15 of Figure 6, looking in the direction of the arrows.

Referring now to the drawings in detail, wherein like reference numerals indicate like parts throughout the several figures, the reference numeral 20 indicates generally a framework having a housing 21 positioned therein. The housing 21 is generally rectangular and is provided with a reduced end portion, generally indicated at 22, to provide a funnel-like opening therefrom. A housing 23 is secured to the top of the housing 21 and extends upwardly therefrom. The housing 23 has the same transverse dimension as the housing 21 and is somewhat shorter in longitudinal dimension, as illustrated in Figure 1.

A tank 24 is mounted on the frame 20 adjacent the housing 23. A hopper 25 having inwardly sloped end walls 26 and 27, and inwardly sloped side walls 28 and 29, is positioned on top of the housing 23 and secured thereto by means of a pair of upwardly extending plates 30 and 31. A cover member 32 is positioned on top of the housing 23 and carries a hopper plate 33 in vertically spaced apart relation thereabove with the bottom of the hopper 25 resting on the hopper plate 33. The hopper 25 is open at 34 between the lower extremities of the walls 26, 27, 28 and 29, and the hopper plate 33 is likewise open at 35 in alignment with the opening 34.

A valve 36 is slidably engaged between the cover 32 and the hopper plate 33 and is provided at its inner end with an inwardly diverging wall 37 and at its outer end with an upwardly extending flange 38, the flange 38 serving as a handle to adjust the valve 36 with relation to the openings 34 and 35. A pin 39 is engageable through an opening in the hopper plate 33, an opening in the valve 36 and an opening in the cover 32. A plurality of openings are provided in the valve 36 to permit the valve 36 to be locked in a plurality of adjusted positions.

Opposite to the valve 36 and cooperating therewith is a valve 40 which is slidably engaged between the cover 32 and the hopper plate 33 and is provided at its inner end with an inwardly diverging wall 41 and at its outer end with an upwardly extending flange 42, the flange 42 serving as a handle to adjust the valve 40 with relation to the openings 34 and 35. A pin 43 is engageable through an opening in the hopper plate 33, an opening in the valve 40 and an opening in the cover 32. A plurality of openings are provided in the valve 40 to permit the valve 40 to be locked in a plurality of adjusted positions.

A frame 44 is secured to the housing 23 exteriorly thereof and carries a pair of journals 45 and 46 disposed on opposite ends of the housing 23. A shaft 47 is rotatably carried by the journals 45 and 46 with the shaft 47 extending through the housing 23. A dual compartment metering member 48 is mounted on the shaft 47 beneath the hopper 25. A central partition 49 divides the metering member 48 into two compartments which are provided with outwardly sloping bottom walls 50 and 51, respectively. The metering member 48 has end walls 52 and 53 which are spaced apart and connected at their lower edges to the opposite ends of the bottom members 50 and 51. Side plates 54 and 55 connect the upper side edges of the end walls 52 and 53 to prevent distortion thereof.

A counterweight arm 56 is secured to one end of the shaft 47 and comprises a tubular member having a slot 57 formed therein. A bracket 58 is secured to the counterweight arm 56 at a point spaced from the shaft 47 and extends through an arcuate slot 59 in the housing 23. The bracket 58 is attached to the end wall 53 of the metering member 48. A counterweight 60 is slidably positioned on the counterweight arm 56 and is secured thereto by means of a bolt 61 in adjusted position.

A pair of adjustable stop members 62 and 63 are adjustably secured to the housing 23 in position to be engaged by a stop plate 64 secured to the counterweight arm 56. The stop members 62 and 63 are each provided with rubber bumper blocks 65 which are secured to flanges 66 formed on the stop members 62 and 63. A bolt 67 is secured to a reinforcing plate 68 mounted on the inside of the housing 23 adjacent the stops 62 and 63 with the bolt 67 extending outwardly through a slot 69 formed in each of the stop members 62 and 63. An inwardly converging hopper 70 is positioned within the housing 23 and arranged, as illustrated in Figure 4, to direct material from the metering member 48 toward the center of the housing 21.

A deflector, generally indicated at 71, is mounted within the housing 21 below the top thereof by any suitable means such as welding or the like, and comprises a pair of converging side walls 72 and 73 and a pair of converging end walls 74 and 75. The end walls 74 and 75 are spaced apart at their lower extremities as are the side walls 72 and 73 to provide a central opening for the bottom of the deflector 71. V-shaped spreaders 76 and 77 are mounted respectively on the side walls 72 and 73 with the apices thereof facing outwardly. Bottom plates 78 and 79 support the V-shaped spreaders 76 and 77, respectively, and are adjustably secured to the side walls 72 and 73 by means of wing bolts 80.

A yoke 81 having mounting plates 82 and 83 integrally secured to the outer ends thereof carries a sleeve 84 at the central portion thereof with the axis of the sleeve 84 extending vertically. The mounting plates 82 and 83 are secured to the housing 21 and the deflector 71 by means of bolts 85.

A grain ring 86 is formed from a cylindrical member and is mounted by means of a plurality of brackets 87 extending to the walls of the housing 21 in a central position within the housing 21 with its axis extending vertically. A rack ring 88 is positioned on top of the grain ring 86 and has the top edge thereof formed with a plurality of rack teeth 89 extending continuously thereabout.

A plurality of scraper blades 90 extend through an internal annular flange 91 on the rack ring 88 and engage the inner face of the grain ring 86. The rack ring 88 and the scraper blades 90 are adapted to rotate on the grain ring 86 so that the inner face of the grain ring 86 will be scraped by the scraper blades 90. A motor bracket 92 extends horizontally across the housing 21 below the grain ring 86 and is supported at its outer ends by means of a pair of bracket supports 93 and 94 which extend upwardly and outwardly to engage the housing 21 to which they are secured by any suitable means. A motor 95 is secured to the motor bracket 92 by means of a base 96 and securing elements 97. Motor 95 has a shaft 98 extending upwardly therefrom and a liquid distributing disc 99 mounted thereon for rotation therewith. The liquid distributing disc is radially corrugated, as at 100, as best shown in Figures 9 and 10, and is positioned coaxially with the grain ring 86.

A pipe 101 is secured in the sleeve 84 by any suitable means and extends downwardly to a position within the grain ring 86 spaced above the disc 99. A grain deflecting cone 102 is mounted on the lower end of the pipe 101 so that the outer annular edge 103 thereof is within the grain ring 86, the pipe 101 being adapted to carry liquid for dropping on the disc 99.

A shaft 104 is mounted in a bracket 105 secured to the inner wall of the housing 21 and is provided with a collar 106 which engages the top of the bracket 105 supporting the shaft 104 therein. Shaft 104 passes through a bore 107 in the wall 72 and a bore 108 in the cover 109 of the housing 21. The upper end of the shaft 104 is provided with a crank arm 110 which is secured thereto and rotates therewith. A connecting rod 111 is pivotally secured to the lower end of the counterweight arm 56 at one end and to the outer end of the crank arm 110 at the other end so that oscillating movement of the counterweight arm 56 will be translated to the shaft 104 causing an oscillating motion thereof. The lower end of the shaft 104 is provided with a double crank arm 112 which is secured thereto and adapted to rotate therewith.

A pawl, generally indicated at 113, comprises an inverted V-shaped guide plate 114, a connecting rod 115 and a pawl tooth 116, with the pawl tooth 116 and connecting rod 115 secured in the apex of the V-shaped guide plate 114. The pawl tooth 116 is adapted to engage the rack teeth 89, as illustrated in Figure 7, with the guide plate 114 preventing the pawl tooth 116 from becoming dislodged from the rack teeth 89. The opposite end 117 of the connecting rod 115 is pivotally secured to one end of the double crank arm 112 so that oscillating motion of said double crank arm 112 will cause the pawl tooth 116 to reciprocate, driving the rack ring 88 in a counterclockwise direction, as illustrated in Figure 6.

A second pawl, generally indicated at 118, likewise includes an inverted V-shaped guide plate 119, a connecting rod 120 and a pawl tooth 121. The pawl tooth 121 is formed oppositely of the pawl tooth 116, as is illustrated in Figure 15, and the connecting rod 120 is secured in the apex of the V-shaped guide plate 119 in the same manner as the construction of the pawl 113. The opposite end 122 of the connecting rod 120 is pivotally secured to the opposite end of the double crank arm 112 so that oscillating motion of the crank arm 112 will cause the pawl tooth 121 to reciprocate, thus driving the rack ring 88 in a counterclockwise direction as viewed in Figure 6. It should be noted that the pawl teeth 116 and 121 are constructed and arranged so that they are in driving engagement with the rack teeth 89 simultaneously and return to a new position with relation to the rack ring 88 simultaneously, thereby driving the rack ring 88 from two spaced points on the circumference thereof to avoid unbalancing the rack ring 88.

The chemical tank 24 is provided with an offset portion 123 which engages over the top edge of the housing 21. A sump 124 is formed in the bottom 125 of the tank 24 and has an internally threaded drain outlet 126 extending from the lowermost point thereof. A bracket 127 is mounted to a wall 128 of the tank 24 and has a pair of arms 129 and 130 extending in parallel vertically spaced-apart relation into the tank 24. A rod 131, having an offset handle 132 formed on one end thereof, is journalled in apertures 133 and 134 formed in the arms 129 and 130, respectively, and has its lower end threaded as at 135 to cooperate with the threaded outlet 126 sealing it against leakage.

A tank 136 is secured to the wall 137 of the tank 24 by any suitable means, with the bottom 138 of the tank 136 vertically spaced above the bottom 125 of the tank 24. The bottom 138 of the tank 136 is provided with a boss 139 having a threaded bore extending vertically therethrough. A rod 140, having an offset handle 141, is provided with a threaded lower end portion 142 which is adapted to be received in sealing engagement in the boss 139.

A delivery tank, generally indicated at 143, comprises a bottom wall 144 having a flange 145 formed along one edge thereof and secured to the tank 136. The bottom wall 144 is sloped downwardly to the opposite side of the tank 136 and is there secured by welding or the like. A pair of side walls 146 and 147 have a generally triangular configuration extending upwardly from the bottom wall 144 and diverging outwardly therefrom with the forward end edges of said walls 146, 147 secured to the tank 136 by welding or the like. A nipple 148 extends through the wall 137 of the tank 24 and into the tank 136 above the sloped bottom wall 144 of the delivery tank 143. An elbow 149 is secured to the nipple 148 and extends at an angle thereto. Flexible plastic tube 150 is secured to the elbow 149 at one end thereof and has a delivery pipe 151 connected to the opposite end thereof.

A by-pass tank 152 is positioned on the cover 109 of the housing 21 between the tank 24 and the housing 23. The by-pass tank 152, as best illustrated in Figures 11 and 12, comprises an elongated rectangular compartment 153 having an upwardly offset end portion 154. A second rectangular compartment 155, substantially shorter than compartment 153, is positioned adjacent to the compartment 153 at the end portion thereof containing the upwardly offset portion 154. A wall 156 separates the compartments 153 and 155. A cover 157 extends over the upwardly offset end portion 154 and the compartment 155, leaving the area 158 at the rear of the upwardly offset portion 154 and the compartment 155 open. A cover 159 extends over the elongated compartment 153 rearwardly of the upwardly offset portion 154. The pipe 151 extends through the opening 158 to a point overlying the compartments 153, 155 and is laterally movable in the opening 158 to direct fluid therefrom into either of the compartments 153 and 155. A handle 160 has a flange 161 extending over the pipe 151 so that by moving the handle 160 laterally, the position of the pipe 151 may be adjusted.

A drain outlet 162 extends from the forward end of the compartment 155 to overhang a cup support 163 on the housing 21. A drain outlet 164 is positioned on the compartment 153 and extends into the housing 23. A flexible plastic tube 165 connects the drain outlet 164 with the top of the pipe 101 so that fluid draining from the delivery tank 143 will pass into the compartment 153 when the pipe 151 is so adjusted, and through the drain outlet 164, the tube 165, the pipe 101, dropping into the disc 99. A pump cylinder 166 is positioned adjacent the tank 136 and is provided with a piston 167 for pumping fluid from the tank 24. The cylinder 166 is mounted in a bracket 168 in the tank 24 and has an outlet fitting 169 extending laterally from the upper end thereof.

The tank 136 has a slot 170 extending downwardly to one side thereof in alignment with the outlet fitting 169, and the outlet fitting 169 projects into the tank 136 therethrough. A plate 171 is secured across the top of the slot 170 to maintain the outlet fitting 169 in position therein. A piston rod 172 extends upwardly from the piston 167 and is adjustably connected at its upper end to a pump arm 173. A bracket 174 is secured to the tank 24 and pivotally supports the opposite end 175 of the pump arm 173 therein.

An L-shaped pump operating arm 176 is secured by means of a bushing 177 to the shaft 47 adjacent the journal 45, extending into the tank 24 overtop of the tank 136. A bracket 178 is secured to the pump operating arm 176 in position so as to overlie the tank 136 and carries a U-shaped dipper arm 179 therein with the dipper arm 179 extending generally at right angles to the pump operating arm 176. The dipper arm 179 has depending end portions 180 and 181 to which are attached dippers 182 and 183, respectively.

A plate 184 is integrally secured to the outer end of the pump operating arm 176 and has a grooved roller 185 journalled thereon by means of a bolt 186. An offset arm 187 extends over the roller 185 and is secured to the plate 184 at 188. The pump arm 173 engages the top of the roller 185 and is adapted to be oscillated vertically as the roller 185 is rocked about the center of the shaft 47. The rocking of the roller 185 causes the piston 167 to reciprocate in the cylinder 166, pumping fluid from the tank 24 into the tank 136. Oscillation of the pump operating arm 176 will alternately cause the dippers 182 and 183 to dip fluid from the tank 136 dumping it into the delivery tank 143.

In the use and operation of the invention, a chemical insecticide and fungicide developed for preplanting treatment of seeds is placed in the tank 24. Seeds to be treated are placed in the hopper 25. The rate of flow of the seed in the hopper 25 is adjusted by the valve plates 36 and 40. The seed then flows into the metering member 48 filling one side thereof to the point that the member becomes unbalanced and rotates with the shaft 47 to a position as illustrated in Figure 4. The seed is dumped from the metering member and the opposite side fills and dumps in a like manner until all seed is emptied from the hopper 25.

The seed dumped from one side of the member 48 is directed by the walls 72 and 73 and spreaders 76 and 77 to the cone 102. The cone 102 causes the seed to be deflected outwardly to the grain ring 86.

Fluid in the tank 24 is pumped into the smaller tank 136, from which it is dipped by the dippers 182 and 183 as described above. The fluid in the delivery tank 143 flows to the by-pass tank 152, flowing into compartments 153 or 155 depending on the position of the pipe 151. Fluid from compartment 155 flows to a test cup (not shown) through outlet pipe 162. Fluid from compartment 153 flows through outlet 164, tube 165, pipe 101, from which it is delivered to the corrugated mist disc 99 which is spinning under the power from motor 95. The fluid is directed radially by the disc 99 to coat the seed from the cone 102. Scraper blades 90, carried by ring rack 88, are rotated so as to scrape the inner face of the grain ring 86 to dislodge any coated grain which sticks.

The rack ring 88 is moved by the pawls 113 and 118 on alternate movements of the metering member 48. The opposite movement of the metering member 48 acts to return the pawls 113 and 118 to starting position.

The seed delivery from the metering member 48 may be varied by adjusting the counterweight 60.

Having thus described the preferred embodiment of the invention, it should be understood that numerous modifications and structural adaptations may be resorted to without departing from the scope of the appended claims.

What is claimed is:

1. A seed treating machine comprising a housing, a mixing cylinder mounted upright in said housing adjacent the lower end portion thereof, a tube vertically supported in said housing and terminating at its lower end between the upper and lower ends of said cylinder, a non-rotating seed distributing cone secured on the lower end portion of said tube, a disc within said cylinder, means supporting and rotating said disc below said tube, a fixed grain deflecting ring mounted concentrically about said cone and said disc, rotatable means mounted on said ring for scraping the inner surface of said ring, means for feeding seed onto said seed distributing cone, means actuated by said seed feeding means for moving said rotatable means, and means for feeding fluid through said tube onto said disc.

2. A device as claimed in claim 1, wherein said seed feeding means includes a pivoted dumping hopper and an adjustable outlet hopper positioned beneath said dumping hopper.

3. A device as claimed in claim 1, wherein said fluid feeding means includes a fluid tank, a reservoir in said tank, means for pumping fluid from said tank to said reservoir, and means for delivering fluid from said reservoir to said tube.

4. A seed treating machine comprising a housing, a mixing cylinder mounted upright in said housing adjacent the lower end portion thereof, a tube vertically supported in said housing and terminating at its lower end between the upper and lower ends of said cylinder, a non-rotating seed distributing cone secured on the lower end portion of said tube, a disc within said cylinder, means supporting and rotating said disc below said tube, means for feeding seed onto said seed distributing cone including a pivoted dumping hopper and an adjustable outlet hopper positioned beneath said dumping hopper, and means for feeding fluid through said tube onto said disc including a pump and means operated by said dumping hopper actuating said pump.

5. A seed treating machine comprising a housing, means in said housing for distributing seed, means in said housing below said seed distributing means for coating said seeds with fluid, and means including a pair of oscillating dippers and a reciprocating pump feeding fluid to said oscillating dippers for feeding fluid to said means for coating said seeds with said last named means actuated by said seed distributing means.

6. A device as claimed in claim 5, wherein said seed distributing means includes a pivoted hopper mounted in said housing, a partition in said hopper, and means for feeding seed into said hopper whereby said hopper is unbalanced and caused to rock on its pivot.

References Cited in the file of this patent

UNITED STATES PATENTS

| | | |
|---|---|---|
| 1,788,345 | Skirvin | Jan. 6, 1931 |
| 1,855,548 | Forster | Apr. 26, 1932 |
| 2,207,924 | Kemp | July 16, 1940 |
| 2,694,556 | Levin | Nov. 16, 1954 |